(12) United States Patent  (10) Patent No.: US 8,887,092 B2
Morrow et al.  (45) Date of Patent: Nov. 11, 2014

(54) CONTACT SELECTOR THAT FACILITATES GRANULAR SHARING OF CONTACT DATA

(75) Inventors: John Morrow, Seattle, WA (US); Neil Pankey, Seattle, WA (US); Michael Farnsworth, Monroe, WA (US); Ashish Bangale, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 301 days.

(21) Appl. No.: 13/230,403

(22) Filed: Sep. 12, 2011

(65) Prior Publication Data

US 2013/0067404 A1    Mar. 14, 2013

(51) Int. Cl.
*G06F 3/048*    (2013.01)
(52) U.S. Cl.
USPC .......................................... 715/810; 715/711
(58) Field of Classification Search
USPC .................................................. 715/810, 711
See application file for complete search history.

(56) References Cited

U.S. PATENT DOCUMENTS

| 7,549,125 | B2 | 6/2009 | Dunn et al. |
| 7,606,725 | B2 | 10/2009 | Robertson et al. |
| 7,774,711 | B2 | 8/2010 | Valeski |
| 7,802,191 | B2 | 9/2010 | Pettinati et al. |
| 7,979,802 | B1 | 7/2011 | Appelman |
| 2004/0199581 | A1 | 10/2004 | Kucharewski et al. |
| 2005/0182741 | A1 | 8/2005 | Grossman et al. |
| 2008/0307306 | A1* | 12/2008 | Pettinati et al. ............... 715/711 |
| 2010/0153284 | A1* | 6/2010 | Hoag et al. .................... 705/319 |

OTHER PUBLICATIONS

"Contacts Basics: Auto-complete, the Contacts Picker, & Adding Personal Contacts", Retrieved at <<http://www.johnmarshall.edu/GoogleApps/docs/contacts_basics.pdf>>, Retrieved Date: Sep. 7, 2011, pp. 1-5.

* cited by examiner

*Primary Examiner* — Peiyong Weng
(74) *Attorney, Agent, or Firm* — Steve Crocker; Jim Ross; Micky Minhas (57) ABSTRACT

Described herein are technologies pertaining to transmitting electronic contact data from a first application to a second application by way of an operating system without generating a centralized contact store or providing the second application with programmatic access to all electronic contact data retained by first application.

20 Claims, 5 Drawing Sheets

CONTACT SELECTOR THAT FACILITATES GRANULAR SHARING OF CONTACT DATA

BACKGROUND

Computer applications have been developed that make it relatively easy for individuals to communicate with one another, locate businesses that sell certain products or services, etc. For example, e-mail applications allow users to nearly instantaneously transmit messages to contacts of such users. Specifically, a user can invoke an e-mail application, enter an e-mail address into a "To" field, generate a message, attach an image or document, and cause the message and attachment to be transmitted to the specified contact(s) in the "To" field. Social networking applications have also been developed, wherein such applications allow users to transmit messages to contacts, share photos and videos with contacts, update a status that is viewable to contacts, and other communications. In yet another example, message broadcasting applications have been developed that allow a user to broadcast relatively short messages (e.g., 140 characters or less) to individuals that subscribe to communications from the user. These applications also allow the user to subscribe to entities (individuals, groups, companies) and receive relatively short messages from such entities.

Oftentimes a single user will use multiple different applications, each of which performs some operation based at least in part upon electronic contact data corresponding to contacts of the user. That is, a user may have installed on a computing device an e-mail application, an instant messaging application, and a social networking application, each of which are configured to facilitate communications between the user and contacts of the user registered with the respective applications. Thus, the user may register different contacts with different applications. There may be instances, however, when a user desires to transmit contact data retained in one application installed on the computing device to another application installed on the computing device. For example, the user may wish to employ an e-mail application to send an e-mail to a contact that is not registered with the e-mail application, but who is registered with a social networking application. Accordingly, the user may wish to transport electronic contact data (an e-mail address) retained by the social networking application for the contact to the e-mail application.

Conventionally, transfer of contact data between applications has been undertaken manually. Therefore, the user can first open one application, access contact information in the one application, copy relevant electronic contact data retained by the one application, invoke another application, and paste the relevant contact information an appropriate field provided by the another application. If the user wishes to transfer electronic contact data corresponding to multiple contacts between applications, it can be ascertained that manually doing so is a time-consuming and labor-intensive process. Accordingly, developers of certain applications have agreed to allow electronic contact data to be transferred therebetween en masse. For example, an e-mail application may be configured to allow a social networking application to retrieve electronic contact data retained by the e-mail application (upon receiving consent of the user to allow such retrieval). This transfer of electronic contact data between applications in this manner, however, is limited to applications with developers that have reached an agreement with one another.

In an attempt to facilitate more global sharing of electronic contact data across applications, operating systems installed on computing devices have been configured to acquire and maintain a centralized contact data store. When an application is installed on a computing device that includes such an operating system, the operating system can detect that the application retains contact information (user identities, e-mail addresses, telephone numbers, physical addresses, etc.). A user of the computing device may then be prompted to indicate whether she desires that electronic contact data retained by the application be shared with other applications. If the user desires for such electronic contact data to be shared, the electronic contact data retained by the application is copied and placed in a centralized store. When another application that utilizes electronic contact data requests access to the electronic contact data in the centralized contact store, the operating system can prompt the user to indicate whether she wishes to provide the second application with access to the centralized contact store. If the user provides access to the centralized contact store to the second application, the second application will have programmatic access to all electronic contact data that is retained in the centralized store.

While this approach allows different applications to access electronic contact data from a variety of other applications, such an approach has inherent deficiencies. First, generating a centralized store of electronic contact data on a computing device presents a security concern, as a malicious hacker may attempt to learn identities of all contacts of the user by obtaining access to the centralized contact store. Further, an application may obtain programmatic access to all electronic contact data retained in the centralized contact store—if the application is malicious, such application may modify electronic contact data in the central store. For instance, a malicious application can change electronic contact data, may delete electronic contact data from the centralized store, etc.

SUMMARY

The following is a brief summary of subject matter that is described in greater detail herein. This summary is not intended to be limiting as to the scope of the claims.

Described herein are various technologies pertaining to sharing of electronic contact data between applications executing on a computing device through utilization of functionality provided by an operating system installed on the computing device. A computing device, such as a personal computer, a laptop computer, a mobile telephone, or the like has an operating system installed thereon that is employed to allocate physical resources of the computing device to various applications executing on such computing device. The computing device may have a plurality of applications installed thereon that retain and/or employ electronic contact data corresponding to contacts of a user of the computing device. Such applications include but are not limited to e-mail applications, social networking applications, message broadcasting applications, instant messaging applications, video conference applications, etc.

The operating system may expose an application programming interface (API) that facilitates invocation of what is referred to herein as a "contact selector" included in the operating system on the computing device. The contact selector, in an exemplary embodiment, may operate as follows: a first application executing on the computing device may invoke the contact selector responsive to a user action, such as a request for electronic contact data. As used herein, electronic contact data is data that facilitates communicating with a contact of the user, such as an e-mail address, an instant messaging alias, a physical address, a telephone number, a social networking alias, etc. Accordingly, the first application may be an e-mail application, an instant messaging application, a social networking application, a message broadcasting application, a video conferencing application, or some other suitable application that is employed in connection with communicating with contacts of the user of the computing device.

Subsequent to being invoked, the contact selector can compile a list of applications installed on the computing device that retain electronic contact data. For instance, during installation, an application can declare that it retains electronic contact data and is willing to share electronic contact data. The contact selector can maintain a list of applications that have declared themselves to be retainers of electronic contact data. The selector component can render a graphical user interface (GUI) on the display screen of the computing device or in communication with the computing device, wherein the GUI includes the list of applications. Additionally, the GUI comprises a defined portion that can be populated with graphical content by an application that has identified itself as a retainer of electronic contact data.

Pursuant to an example, the user may select an application (a second application) in the list of applications that includes electronic contact data that is desirably provided to the first application. Responsive to receiving the selection of the second application, the contact selector can instantiate the second application. This informs the second application that it has been invoked by the contact selector. The second application may then populate the aforementioned portion of the GUI rendered by the contact selector with a list of contacts retained by the second application. Thus, the user is presented with the list of contacts in a form set forth by the second application.

The user may then select contacts from the list of contacts presented by the second application. The second application then provides the contact selector with electronic contact data corresponding to the contacts selected by the user. It can therefore be ascertained that the contact selector only receives electronic contact data corresponding to contacts selected by the user. The contact selector can update the GUI to graphically illustrate to the user which contacts have been selected for provision to the first application. If the user made a mistake (mis-clicked or accidentally selected an incorrect contact), the user can cancel provision of electronic contact data to the first application and correct her selection. Alternatively, the user can select a different application from the list of applications and be provided with contacts retained by the different application. The different application is then instantiated, and populates the portion of the GUI with a list of contacts retained thereby. Thereafter, the user may select contacts in the list of contacts. Therefore, the contact selector facilitates provision of electronic contact data corresponding to multiple different contacts from a plurality of different applications without generating a central contact repository. Once the user has selected the desired contacts, the user can cause the corresponding electronic contact data to be provided to the first application. In such approach, the first application is only provided with programmatic access to electronic contact data corresponding to contacts specifically selected by the user, but is not provided with programmatic access to electronic contact data corresponding to contacts unselected by the user.

Other aspects will be appreciated upon reading and understanding the attached figures and description.

DETAILED DESCRIPTION

Various technologies pertaining to granularly sharing electronic contact data corresponding to contacts of a user across applications will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
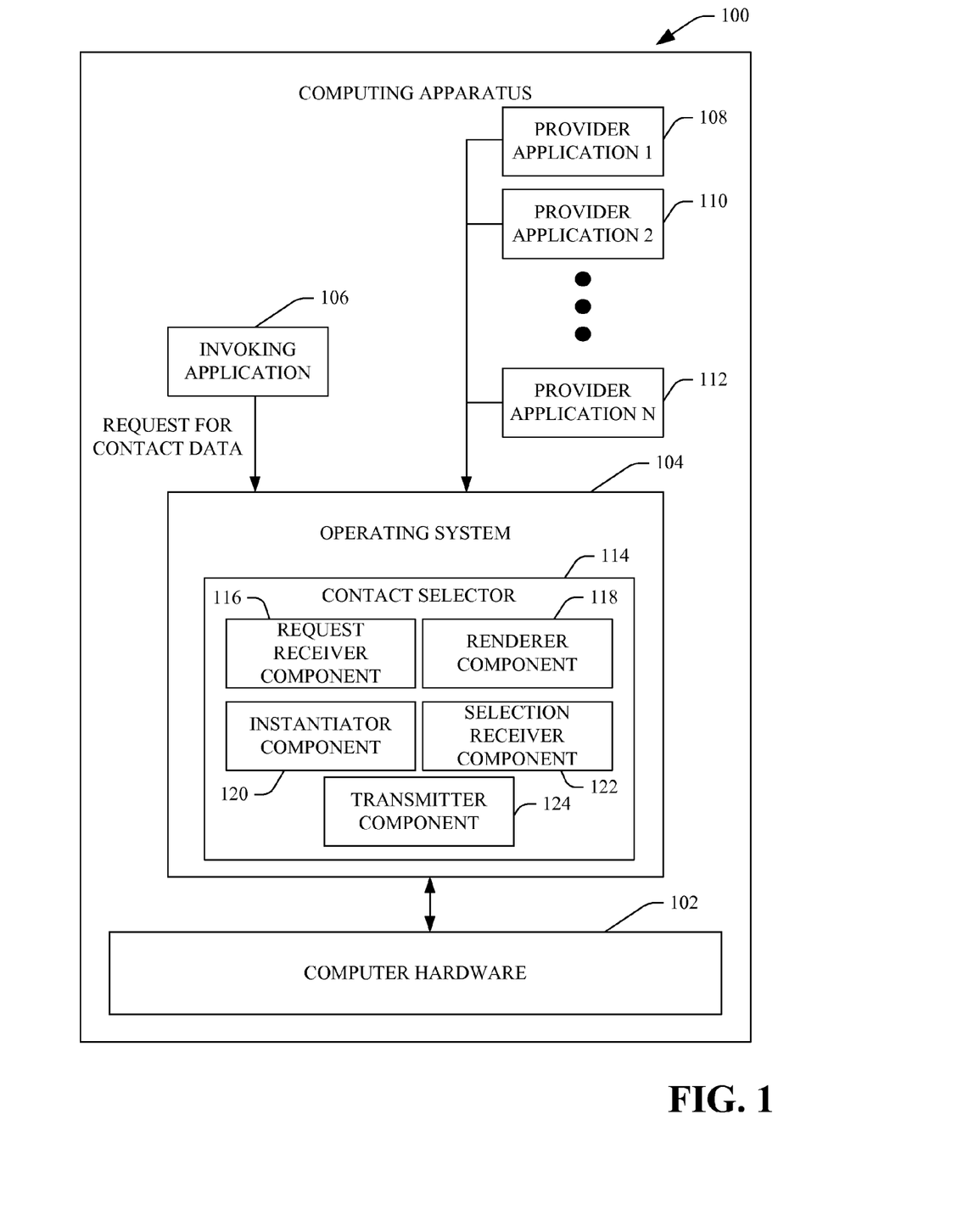
FIG. 1 is a functional block diagram of an exemplary system that facilitates granular sharing of electronic contact data between applications installed on a computing device.

With reference now to FIG. 1, an exemplary computing apparatus 100 is illustrated. The computing apparatus 100 may be any suitable computing apparatus, including but not limited to a desktop computer, a laptop computer, a netbook, a tablet computing device, a portable telephone, a portable media player, a portable gaming console, or the like. The computing apparatus 100 comprises computer hardware 102, wherein the computer hardware 102 comprises at least one processor and memory that includes instructions that are executed by the processor. The computer hardware 102 can additionally include, for instance, a hard drive. Moreover, the computer hardware 102 may include a display screen that is embedded in the computing apparatus 100 and/or is connected to the computing apparatus 100 by way of a suitable connection.

The computing apparatus 100 has an operating system 104 that is executed thereon. As will be understood by one skilled in the art, the operating system 104 manages the resources of the computer hardware 102 and provides common services for execution of various applications that are installed on the computing apparatus 100.

The computing apparatus 100 additionally has an invoking application 106 installed thereon. The invoking application 106 will also be referred to herein as the first application. The invoking application 106 is an application that retains and/or utilizes electronic contact data to facilitate transmitting and/or receipt of data to and/or from contacts of the user of the computing apparatus 100. Therefore, in an example, the invoking application 106 can be an e-mail application that facilitates transmittal and receipt of e-mails to and from contacts of the user of the computing apparatus 100. In another example, the invoking application 106 may be a social networking application that facilitates transmittal and receipt of status updates images, private messages, or the like to and from contacts of the user of the computing apparatus 100. In yet another example, the invoking application 106 may be an instant messaging application that facilitates transmittal and receipt of instant messages to and from contacts of the user of the computing apparatus 100. In still yet another example, the invoking application 106 may be a message broadcasting application that facilitates receipt of messages broadcast by entities (users, groups of users, companies, etc.) subscribed to by the user of the computing apparatus 100. In another example, the invoking application 106 may be a video telecommunications application that allows users to communicate with one another by way of a live audio/video feed. In yet another example, the invoking application 106 may be a video game application that allows the user of the computing apparatus 100 to play a game with a contact of such user. It is therefore to be understood that the invoking application 106 may be any suitable application that can receive and/or send communications from and/or to contacts of the user of the computing apparatus 100.

The computing apparatus 100 may also have a plurality of provider applications 108-112 installed thereon. The provider applications 108-112 include a first provider application 108, a second provider application 110, through an Nth provider application 112. The provider applications 108-112 may be any suitable computer executable applications that retain electronic contact data corresponding to contacts of the user of the computing apparatus 100. Therefore, for example, the first provider application 108 may be an e-mail application that retains identities of e-mail contacts of the user of the computing apparatus 100 and e-mail addresses corresponding thereto. The second provider application 110 may be a social networking application that retains identities of contacts of the user of the computing apparatus 100, e-mail addresses of such contacts, telephone numbers of such contacts, etc. The Nth provider application 112 may be an instant messaging application that retains identities of contacts of the user of the computing apparatus 100 and corresponding instant messaging aliases. In another example, both the first provider application 108 and the second provider application 110 may be e-mail applications. It is thus to be understood that the plurality of applications 108-112 may include any suitable combination of applications that retain electronic contact data corresponding to contacts of the user of the computing apparatus 100.

The user of the computing apparatus 100 may desire that electronic contact data in at least one of the provider applications 108-112 be transferred/accessible to the invoking application 106. For instance, the invoking application 106 may be a first e-mail application and the provider application 108 may be a second e-mail application. The user of the computing apparatus 100 may wish to send an e-mail by way of the invoking application 106 to a contact of the user of the computing apparatus 100 that is retained by the first provider application 108 but is not retained by the invoking application 106. In such a case, the user may interact with the invoking application 106 to inform the invoking application 106 that electronic contact data corresponding to a contact of the user is desirably received from at least one of the provider applications 108-112. Responsive to receiving such user interaction, the invoking application 106 can transmit a request for electronic contact data.

The operating system 104 includes a contact selector 114 that receives a request for electronic contact data from the invoking application 106. In other words, the request for electronic access data output by the invoking application 106 invokes the contact selector 114. As discussed above, electronic contact data includes data that facilitates communicating with a contact of a user of the computing apparatus 100, and includes but is not limited to an e-mail address, an instant messaging alias, a social networking application alias, a message broadcast application alias, a telephone number, a physical address, a video game alias, etc.

The contact selector 114 comprises a request receiver component 116 that receives the request for electronic contact data from the invoking application 106. Responsive to receiving the request, the request receiver component 116 can compile a list of the provider applications 108-112. Specifically, when an application is installed on the computing apparatus 100, such application can indicate whether or not the application retains electronic contact data and is willing to share the electronic contact data. Applications that indicate that they retain electronic contact data and are willing to share such data are referred to as provider applications, and can be identified as such to allow for compilation of a list of provider applications.

The contact selector 114 further comprises a renderer component 118 that is in communication with the request receiver component 116 and renders a graphical user interface on a display screen of the computing apparatus 100 or in communication with the computing apparatus 100. Pursuant to an example, the graphical user interface rendered on the display screen by the renderer component 118 can include a plurality of graphical icons that are representative of the plurality of provider applications 108-112 (which were included in the list of applications).

The user of the computing apparatus 100 may then use a suitable selection mechanism such as a mouse, a touch sensitive display, a stylus, a voice command, or the like to select a provider application from which electronic contact data is desirably extracted. The contact selector 114 additionally comprises an instantiator component 120 that instantiates an instance of the provider application selected by the user of the computing apparatus 100. Instantiating an instance of the selected provider application informs the provider application that the contact selector 114 has been invoked by the invoking application 106 and that the provider application has been selected by the user of the computing apparatus 100.

At least a portion of the graphical user interface rendered by the renderer component 118 can be populated by the instance of the selected provider application instantiated by the instantiator component 120. Accordingly, the selected provider application is able to present a list of contacts retained thereby in the portion of the graphical user interface in a format that is defined by the selected provider application. Moreover, as the selected provider application is populating the portion of the graphical user interface rendered by the renderer component 118, the contact selector 114 does not acquire or maintain a list of contacts retained by the selected provider application. Furthermore, contacts are presented to the user in a format that is defined by the selected provider application (and most likely in a format that is familiar to the user of the computing apparatus 100).

The user of the computing apparatus 100 may then review contacts presented in the graphical user interface by the selected provider application and can select one or more contacts that have corresponding electronic contact data that is desirably provided to the invoking application 106. The user of the computing apparatus 100 may select one or more contacts presented by the provider application in the graphical user interface rendered by the renderer component 118, and the provider application can transmit an indication of the selected contacts to the contact selector 114. The contact selector 114 can comprise a selection receiver component 122 that receives the indication from the provider application that a contact has been selected by the user of the computing apparatus 100. Further, the selection receiver component 122 can further receive electronic contact data corresponding to the selected contacts. For instance, the contact selector 114 can expose a schema that can be analyzed by the provider applications 108-112, wherein the schema indicates types of electronic contact data that can be received from the provider applications 108-112. The schema, for example, may include a field for a name of a contact, a field for an e-mail address of a contact, a field for an instant messaging alias of a contact, a field for a social networking alias of a contact, a field for a broadcast application alias of a contact, a field for an image (avatar) corresponding to a contact, an open field that allows the provider applications 108-112 to provide metadata (e.g., profile data) for instance, corresponding to a contact, amongst other suitable fields.

As the user selects contacts in the list of contacts presented by the selected provider application, the renderer component 118 can render a list of selected contacts in the graphical user interface for review by the user of the computing apparatus 100. Accordingly, if the user of the computing apparatus 100 has accidentally mis-clicked and selected a contact with electronic contact data that is not desirably transmitted to the invoking application 106, the user of the computing apparatus 100 can deselect such contact. Alternatively, if the user of the computing apparatus 100 approves the list of contacts that have been selected by the user, then the user can the press a button (a "confirm" button). Responsive to depression of such button, a transmitter component 124 in the contact selector 114 can transmit electronic contact data corresponding to contacts selected by the user to the invoking application 106.

The invoking application 106 does not receive electronic contact data corresponding to contacts that were not selected by the user of the computing apparatus 100. Therefore, the invoking application 106 does not obtain programmatic access to electronic contact data corresponding to contacts unselected by the user of the computing apparatus 100. Further, the contact selector 114 does not acquire electronic contact data corresponding to unselected contacts. Additionally, the contact selector 114 does not generate or maintain a data store comprising electronic contact data corresponding to contacts of the user of the computing apparatus 100 retained by the provider applications 108-112. Instead, the contact selector 114 acts as a communications mediator that facilitates granular user selection of approved contacts for sharing of electronic contact data between applications installed on the computing apparatus 100.

In the example set forth above, the renderer component 118 renders the graphical user interface such that it includes a list of provider applications and a portion that is populated by a selected provider application. It is to be understood that the contact selector 114 can automatically select a default provider application such that the default provider application can populate the portion of the graphical user interface rendered by the renderer component 118 with a list of contacts retained by the default provider application. In other words, the instantiator component 120 can automatically instantiate an instance of the default provider application. Pursuant to an example, the invoking application 106 may be the default provider application. In another example, a most frequently utilized provider application may be the default provider application. In yet another example, a most recently utilized application may be the default application.

In an exemplary embodiment, the invoking application 106 may be an e-mail application and the user of the computing apparatus 100 may indicate to the e-mail application that an e-mail is desirably transmitted to a contact of the user of the computing apparatus 100 (regardless of whether the e-mail application retains electronic contact data corresponding to the contact). This can cause the invoking application 106 to transmit a request for electronic contact data to the contact selector 114, and such request can be received by the request receiver component 116. The request receiver component 116 can compile a list of provider applications and can select the e-mail application as the default provider application. The instantiator component 120 can instantiate an instance of the e-mail application. The renderer component 118 can render the graphical user interface such that such interface includes a list of provider applications (including the e-mail application). The e-mail application can populate a portion of the graphical user interface with a list of contacts retained by such e-mail application. If the e-mail application retains the contact desired by the user of the computing apparatus 100, the user can select the contact from the portion of the graphical user interface, and the e-mail application can transmit electronic contact data to the selection receiver component 122. The user can indicate that the electronic contact data is desirably transmitted to the e-mail application (by depressing a "confirm" button), and the transmitter component 124 can transmit the electronic contact data to the invoking application 106. The example set forth above is intended to illustrate that the invoking application 106 may also be the provider application.

Furthermore, the contact selector 114 can facilitate provision of electronic contact data to the invoking application 106 corresponding to multiple different contacts retained by multiple different provider applications. For instance, through an interaction with the invoking application 106, the user of the computing apparatus 100 can cause the invoking application 106 to generate the request for electronic contact data to the contact selector 114. The request receiver component 116 can receive such request for electronic contact data and can compile the list of provider applications. The renderer component 118 can render the graphical user interface such that the graphical user interface comprises the plurality of selectable icons that correspond to the provider applications 108-112, and the user of the computing apparatus 100 may select an icon corresponding to a particular provider application. The provider application may populate a portion of the graphical user interface rendered by the renderer component 118 with a list of contacts, and the user may select one or more of such contacts. The selection receiver component 122 can receive an indication from the selected provider application that certain contacts have been selected, and the provider application can transmit electronic contact data corresponding to the certain contacts to the selection receiver component 122.

The user may then choose to select additional contacts from other provider applications. Accordingly, the user can select another graphical icon in the graphical user interface which can cause the instantiator component 122 instantiate an instance of the newly selected provider application. This provider application then populates the portion of the graphical user interface with a list of contacts retained by such provider application, and the user can select desired contacts. As described above, the selected provider application can indicate to the contact selector 114 that certain contacts have been selected and can provide the selection receiver component 122 with electronic contact data corresponding to the selected contacts. The renderer component 118 can render the graphical user interface such that the user of the computing apparatus 100 can ascertain which contacts have been selected from which applications. If the user wishes to cause the electronic contact data corresponding to different contacts retrieved from the different provider applications to be transmitted to the invoking application 106, the user can depressed the "confirm" button and the transmitter component 104 can transmit electronic contact data from the multiple different provider applications to the invoking application 106.

Figure 2:
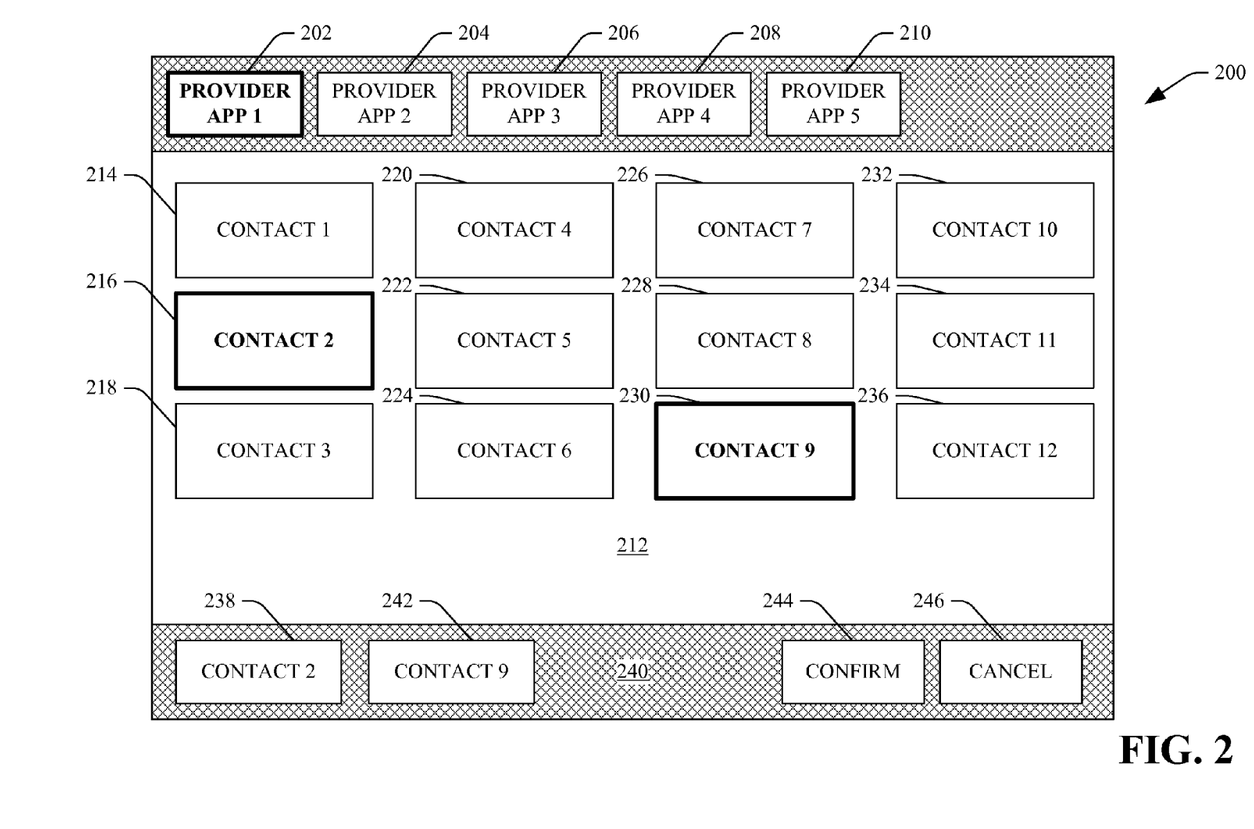
FIG. 2 is an exemplary graphical user interface that facilitates sharing of electronic contact data between applications installed on a computing device.

With reference now to FIG. 2, an exemplary graphical user interface 200 that can be rendered by the renderer component 118 of the contact selector 114 is illustrated. The graphical user interface 200 comprises a list of provider applications 202-210 that retain electronic contact data corresponding to contacts of the user of the computing apparatus 100. The exemplary graphical user interface 200 illustrates five different provider applications 202 through 210 positioned along an upper portion of the graphical user interface 200. Number of provider applications listed and position of the list of provider applications is not limited to what is shown in FIG. 2.

The order of presentation of the provider applications 202-210 in the list may be from most recently utilized to least recently utilized, alphabetically arranged, most frequently utilized to least frequently utilized, or any other suitable manner for determining an order of provider applications. In the exemplary graphical user interface 200, a selectable icon corresponding to the first provider application 202 is shown as being selected by the user or as the default application automatically selected by the contact selector 114.

The graphical user interface 200 also comprises a portion 212 that is populated by an instance of the first provider application 202 selected by the user or automatically selected by the contact selector 114. Here, the portion 212 is shown as comprising a list of selectable contacts as presented by the first provider application 202. The content and appearance of contacts in the list of contacts presented by the first provider application 202 in the portion 212 of the graphical user interface 200 are defined by the first provider application 202. In the example shown in FIG. 2, the portion 212 includes a plurality of contacts 214-236. In this example, the user has selected the 2nd contact 216 and the ninth contact 230 from amongst the plurality of contacts 214-236 presented by the first provider application 202. It is to be understood that the second contact 216 and the ninth contact 230 are highlighted in FIG. 2 for purposes of explanation only, as the first provider application 202 may choose not to highlight contacts when selected by the user of the computing apparatus 100.

As described above, the first provider application 202 will provide the contact selector 114 with electronic contact data corresponding to contacts selected by the user in the portion 212 of the graphical user interface 200. Accordingly, immediately subsequent to the user selecting the second contact 216 in the portion 212 of the graphical user interface, the first provider application 202 will provide the contact selector 114 with electronic contact data corresponding to the second contact 216. The renderer component 118 can then cause data 238 that identifies the second contact 216 to be graphically displayed in another portion 240 of the graphical user interface 200. Additionally, the renderer component 118 can cause data 242 that identifies the ninth contact 230 to be graphically displayed in the portion 240 of the graphical user interface 200. Therefore, the renderer component 118, by presenting the data 238 and 242 in the portion 240 of the graphical user interface 200, can inform the user of which contacts have been previously selected as well as what electronic contact data is to be transmitted to the invoking application 106. Additionally, such data in the portion 240 can assist the user in remembering which electronic contacts have been selected across different of the provider applications 202-210 for provision to the invoking application 106.

The graphical user interface 200 may also comprise a "confirm" button 244 and a cancel button 246. If the user depresses the cancel button 246, the transmitter component 124 will fail to transmit electronic contact data corresponding to the selected contacts to 216 and 230 to the invoking application 106. The user of the computing apparatus 100 may then select different contacts in the list of contacts presented in the portion 212 of the graphical user interface 200 by the first provider application 202, may select another provider application from amongst the list of provider applications 202-210, or may choose to fail to provide the invoking application 106 with electronic contact data. If the user of the computing apparatus 100 depresses the "confirm" button 244, electronic contact data shown in the data 238 and the data 242 is transmitted to the invoking application 106. As mentioned previously, the invoking application 106 only receives electronic contact data selected by the user and does not acquire programmatic access to electronic contact data corresponding to contacts unselected by the user of the computing apparatus 100.

Figure 3:
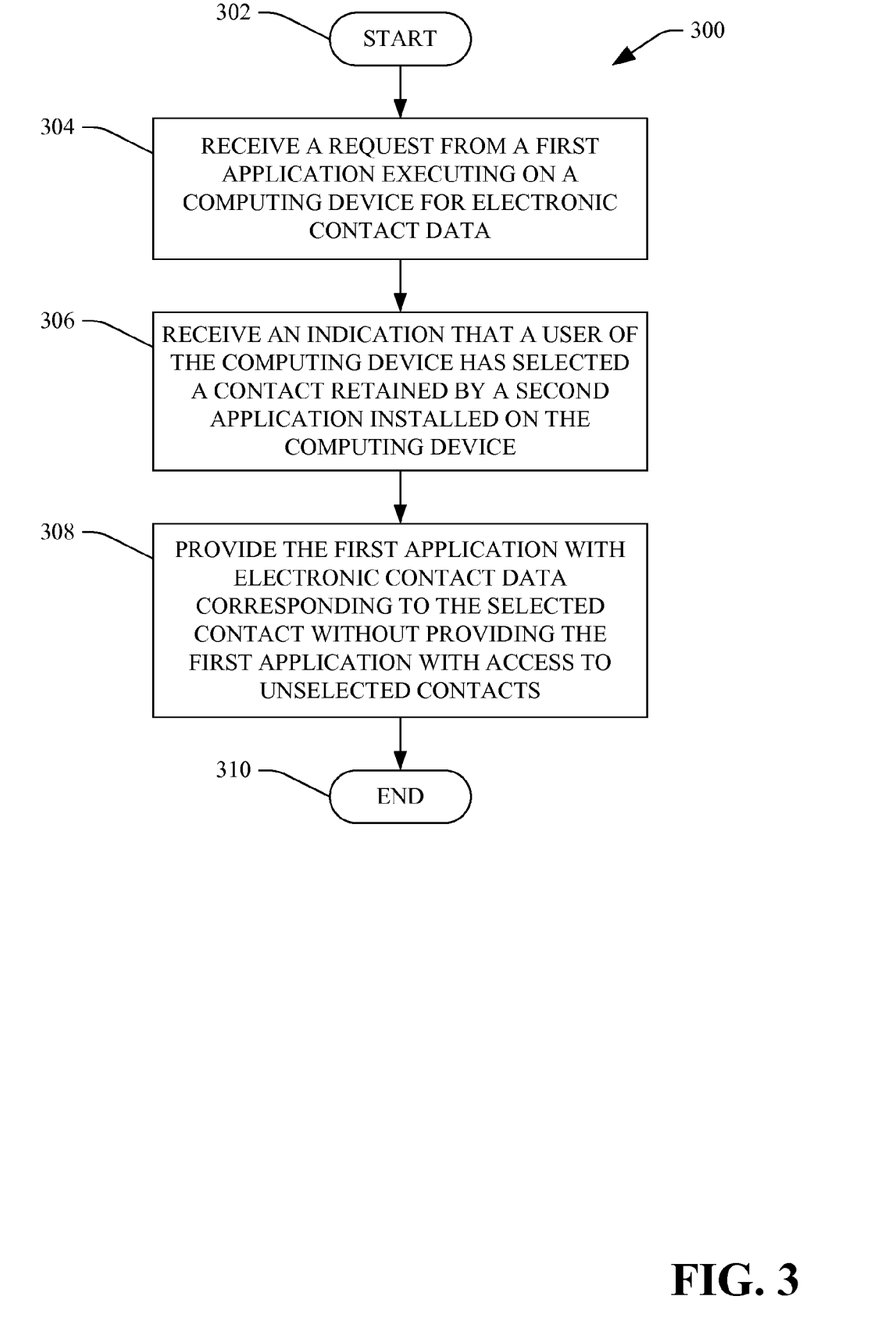
FIG. 3 is a flow diagram that illustrates an exemplary methodology for providing an application installed on a computing device with electronic contact data.
Figure 4:
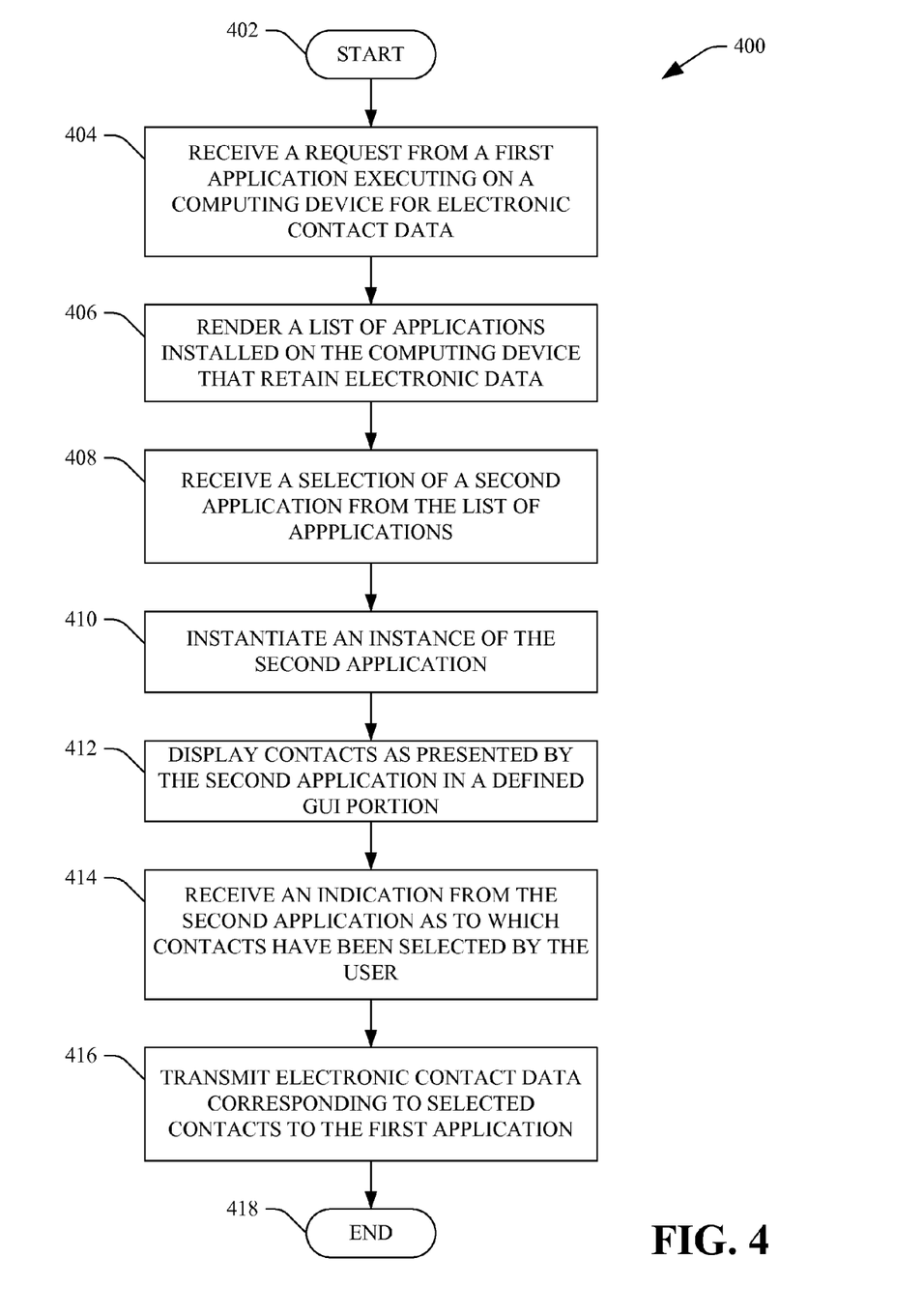
FIG. 4 is a flow diagram that illustrates an exemplary methodology for providing an application with electronic contact data from another application.

With reference now to FIGS. 3-4, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 3, an exemplary methodology 300 that facilitates provision of electronic contact data to an application executing on a computing apparatus is illustrated. The methodology 300 starts at 302, and at 304 in an operating system installed on a computing device, a request is received from a first application executing on the computing device for electronic contact data. For instance, the first application can transmit the request for electronic contact data responsive to some user interaction with respect to the first application. Alternatively, the first application can autonomously transmit the request for electronic contact data.

At 306, an indication that the user of the computing device has selected a contact retained by a second application installed on the computing device is received in the operating system. As described above, a list of contacts retained by the second application can be presented to the user in a graphical user interface.

At 308 the operating system provides the first application with electronic contact data corresponding to the selected contact retained by the second application without providing the first application with programmatic access to electronic contact data corresponding to contacts that were not selected by the user of the computing device. Therefore, it can be ascertained that the user has granular control of which electronic contact data retained by the second application or other applications installed the computing device is provided to the first application. The methodology 300 completes at 310.

Now referring to FIG. 4, an exemplary methodology 400 that facilitates providing a first application with electronic contact data retained by a second application installed in a computing device is illustrated. The methodology 400 starts at 402, and at 404 a request from a first application executing on a computing device for electronic contact data is received. At 406, responsive to receiving the request, a list of applications that retain contacts is rendered on a display screen of the computing device. Each application in the list of applications is installed on the computing device.

At 408, a selection of a second application from the list of applications is received from a user of the computing device. At 410, responsive to receiving such selection, an instance of the second application is instantiated on the computing device.

At 412, electronic contact data is displayed as presented by the second application in a defined portion of a graphical user interface. In other words, the instance of the second application is provided with at least a portion of a graphical user interface in which to display contacts retained by the second application such that the second application displays contacts in a format defined by the second application (and not by the operating system).

At 414, an indication is received from the second application as to which contacts have been selected by the user. Thus, the second application outputs data that indicates that the user of the computing device has selected a contact displayed in the at least the portion of the graphical user interface. The indication can comprise electronic contact data corresponding to the electric contact, such as e-mail address, instant messaging alias, etc.

At 416, electronic contact data corresponding to the selected contact is transmitted to the first application without providing programmatic access to unselected contacts to the first application. The methodology 416 completes at 418.

Figure 5:
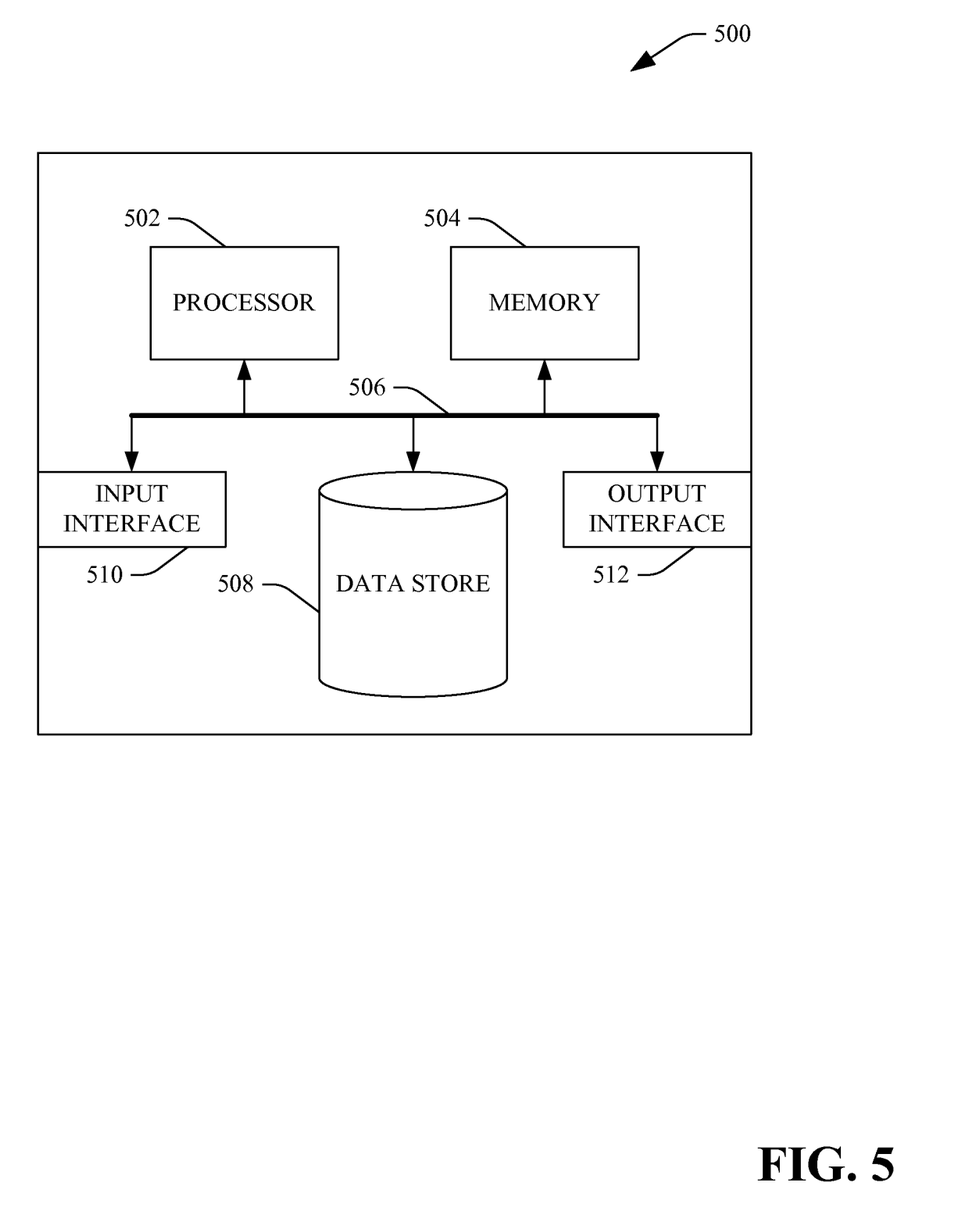
FIG. 5 is an exemplary computing system.

Now referring to FIG. 5, a high-level illustration of an exemplary computing device 500 that can be used in accordance with the systems and methodologies disclosed herein is illustrated. For instance, the computing device 500 may be used in a system that supports provision of electronic contact data to an invoking application. In another example, at least a portion of the computing device 500 may be used in a system that supports mediating communications between applications. The computing device 500 includes at least one processor 502 that executes instructions that are stored in a memory 504. The memory 504 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store electronic contact data, a list of provider applications, images, etc.

The computing device 500 additionally includes a data store 508 that is accessible by the processor 502 by way of the system bus 506. The data store may be or include any suitable computer-readable storage, including a hard disk, memory, etc. The data store 508 may include executable instructions, electronic contact data, a list of provider applications, etc. The computing device 500 also includes an input interface 510 that allows external devices to communicate with the computing device 500. For instance, the input interface 510 may be used to receive instructions from an external computer device, from a user, etc. The computing device 500 also includes an output interface 512 that interfaces the computing device 500 with one or more external devices. For example, the computing device 500 may display text, images, etc. by way of the output interface 512.

Additionally, while illustrated as a single system, it is to be understood that the computing device 500 may be a distributed system. Thus, for instance, several devices may be in communication by way of a network connection and may collectively perform tasks described as being performed by the computing device 500.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
in an operating system installed on a computing device,
receiving a request from a first application for electronic contact data, wherein electronic contact data comprises data that facilitates communicating electronically with a contact of a user of the computing device;
rendering a graphical user interface on a display screen of the computing device responsive to receiving the request from the first application, the graphical user interface comprising a graphical icon that represents a second application;
receiving a selection of the graphical icon;
responsive to receiving the selection of the graphical icon, displaying, on a display of the computing device, a list of contacts retained by the second application;
receiving an indication that the user of the computing device has selected a first contact from the list of contacts retained by the second application, wherein a second contact from the list of contacts is unselected; and
providing the first application with electronic contact data of the first contact retained by the second application without providing the first application access to electronic contact data of the second contact that was not selected by the user of the computing device from the list of contacts retained by the second application.

2. The method of claim 1, wherein the data that facilitates communicating electronically with the contact of the user of the computing device comprises at least one of an email address of the contact of the user, an instant messaging alias of the contact of the user, a telephone number of the contact of the user, or a social networking alias of the contact of the user.

3. The method of claim 1, further comprising:
instantiating an instance of the second application responsive to receiving the selection of the graphical icon from the user of the computing device, wherein the instance of the second application displays the list of contacts in a portion of the graphical user interface.

4. The method of claim 3, further comprising:
exposing a schema to the second application that comprises a plurality of predefined fields, wherein the second application indicates by way of mappings where data in electronic contact data set forth by the second application corresponds to the plurality of predefined fields, wherein providing the electronic contact data to the first application comprises providing schematized electronic contact data to the first application.

5. The method of claim 3, further comprising:
receiving an indication from a third application that the user of the computing device has selected a third contact retained by the third application; and
re-rending the graphical user interface to graphically depict to the user that the first contact retained by the second application and the third contact retained by the third application have been selected prior to providing the first application with electronic contact data corresponding to either the first contact retained by the second application or the third contact retained by the third application.

6. The method of claim 5, further comprising:
receiving an indication from the user that the first application is to receive the electronic contact data retained by the second application and the electronic contact data retained by the third application; and
providing the first application with electronic contact data from both the second application and the third application only after the indication has been received from the user.

7. The method of claim 3, wherein the graphical user interface comprises a plurality of graphical icons that are respectively representative of a plurality of applications, the method further comprising:
selectively arranging the plurality of graphical icons such that a graphical icon that is representative of a most recently invoked application is displayed first in the plurality of graphical icons.

8. The method of claim 3, wherein the second application is installed on the computing device, the method further comprising:
during installation of the second application on the computing device, detecting that the second application retains contacts; and
including the second application in a list of applications based at least in part upon the detecting that the second application retains contacts.

9. The method of claim 1, wherein the operating system fails to acquire electronic contact data of the second contact.

10. The method of claim 1, the first application being one of an email application, a social networking application, a message broadcasting application, or an instant messaging application.

11. The method of claim 10, the second application being one of an email application, a social networking application, a message broadcasting application, or an instant messaging application.

12. The method of claim 1, the computing device being a mobile telephone.

13. A computing apparatus, comprising:
a processor; and
a memory that comprises an operating system, a first computer-executable application that executes on the operating system, and a second computer-executable application that executes on the operating system, the operating system comprising a plurality of components that are executable by the processor, the plurality of components comprising:
a request receiver component that receives a request from the first computer-executable application for access to electronic contact data, wherein electronic contact data comprises at least one of an email address, a telephone number, a physical address, an instant messaging handle, or a broadcast service handle;
a renderer component that, responsive to receiving the request from the first computer-executable application, renders a graphical user interface that comprises a graphical icon that is representative of the second computer-executable application, wherein when the graphical icon is selected, at least a portion of the graphical user interface is populated by the second computer-executable application, the second computer-executable application retains respective electronic contact data for a plurality of contacts, the at least the portion of the graphical user interface displaying the plurality of contacts;
a selection receiver component that receives, from the second computer-executable application, electronic contact data of a contact selected by the user from the plurality of electronic contacts, the selection receiver component fails to receive electronic contact data of a second contact from the plurality of electronic contacts not selected by the user; and
a transmitter component that transmits the electronic contact data of the contact selected by the user to the first computer-executable application without providing access to the first computer-executable application to the electronic contact data of the second contact from the plurality of contacts.

14. The computing apparatus of claim 13, wherein the graphical user interface rendered by the renderer component further comprises a list of graphical icons that respectively represent computer-executable applications that retain electronic contact data, the graphical icon included in the list of graphical icons.

15. The computing apparatus of claim 13 being a mobile computing device.

16. The computing apparatus of claim 15, the mobile computing device being a mobile telephone.

17. The computing apparatus of claim 13, wherein the first computer-executable application is one of an email application, a social networking application, a message broadcasting application, or an instant messaging application.

18. The computing apparatus of claim 13, wherein the transmitter component transmits electronic contact data of a plurality of different contacts selected by the user, the electronic contact data of the plurality of contacts retained by numerous computer-executable applications installed on the computing apparatus.

19. The computing apparatus of claim 13, wherein the transmitter component transmits the electronic contact data in accordance with a predefined schema.

20. A computing apparatus comprising a computer-readable medium, the computer-readable medium comprising instructions that, when executed by a processor, cause the processor to perform acts comprising:
receiving a request from a first application being executed by the processor for electronic contact data, electronic contact data comprising at least one of an email address, a telephone number, a physical address, an instant messaging alias, or a message broadcasting application alias;
responsive to receiving the request, rendering a list of graphical icons that are respectively representative of applications that retain contacts, the list of graphical icons comprises a graphical icon that is representative of a second application, each application in the applications being installed on the computing apparatus;
receiving a selection of the graphical icon from the list of graphical icons from a user of the computing apparatus;

responsive to receiving the selection from the user, instantiating an instance of the second application;

providing the instance of the second application with at least a portion of a graphical user interface in which to display contacts retained by the second application such that the second application displays contacts in a format defined by the second application;

receiving an indication from the second application that the user of the computing apparatus has selected a first contact displayed in the at least the portion of the graphical user interface, the indication comprising electronic contact data corresponding to the selected contact, wherein a second contact has failed to be selected; and transmitting the electronic contact data of the selected contact to the first application without providing the first application with second electronic contact data of the second contact.

* * * * *